United States Patent [19]
Parker et al.

[11] 3,887,635
[45] June 3, 1975

[54] ALKYLATION PROCESS UTILIZING HALOSULFURIC OR TRIHALOMETHYLSULFONIC ACID WITH A CATALYST MODERATOR

[75] Inventors: Paul T. Parker, Baton Rouge, La.; Ivan Mayer, Summit, N.J.

[73] Assignee: Exxon Research and Engineering Company, Linden, N.J.

[22] Filed: Aug. 27, 1973

[21] Appl. No.: 391,864

Related U.S. Application Data

[63] Continuation-in-part of Ser. No. 201,389, Nov. 23, 1971, abandoned.

[52] U.S. Cl.................... 260/683.47; 260/683.58
[51] Int. Cl.............................................. C07c 3/54
[58] Field of Search....... 260/683.4, 683.43, 683.47, 260/683.58, 683.59

[56] References Cited
UNITED STATES PATENTS

| | | | |
|---|---|---|---|
| 2,286,183 | 6/1942 | Bradley et al.................. | 260/683.63 |
| 2,313,103 | 3/1943 | Thomas......................... | 260/683.47 |
| 2,353,596 | 7/1944 | Shiffler et al.................. | 260/683.58 |
| 2,413,777 | 1/1947 | Oakley et al................... | 260/683.63 |
| 2,425,572 | 8/1947 | Slotterbeck.................... | 260/683.63 |
| 2,460,719 | 2/1949 | Stover.......................... | 260/683.43 |
| 2,468,529 | 4/1949 | Voorhies, Jr. et al........... | 260/683.59 |
| 3,655,807 | 4/1972 | Rakow et al.................... | 260/683.63 |
| 3,766,293 | 10/1973 | Parker et al.................... | 260/683.58 |

Primary Examiner—Delbert E. Gantz
Assistant Examiner—G. J. Crasanakis
Attorney, Agent, or Firm—Leon Chasan

[57] ABSTRACT

A hydrocarbon conversion process for producing high octane alkylate by contacting a saturated hydrocarbon, preferably a $C_4$—$C_6$ isoparaffin, and an olefin, preferably a $C_2$—$C_{12}$ monoolefin, with a catalyst formed from a strong halosulfuric acid and a catalyst moderator. The catalyst moderator is selected from (1) water, (2) $C_1$—$C_7$ monohydroxy alcohols, (3) difluorophosphoric acid, (4) $C_2$—$C_5$ monoether, (5) aromatic sulfonic acid, and (6) minor amounts of sulfuric acid.

33 Claims, 1 Drawing Figure

3,887,635

ALKYLATION PROCESS UTILIZING HALOSULFURIC OR TRIHALOMETHYLSULFONIC ACID WITH A CATALYST MODERATOR

CROSS REFERENCE TO RELATED APPLICATION

This application is a continuation-in-part of application Ser. No. 201,389, filed Nov. 23, 1971 now abandoned.

BACKGROUND OF THE INVENTION

1. Field of the Invention

The present invention concerns a hydrocarbon conversion process. More particularly, the invention relates to an improved alkylation process for the preparation of branched chain hydrocarbons by contacting saturated hydrocarbons, preferably saturated isoparaffinic hydrocarbons, with olefins in the presence of an acid catalyst system. Still more particularly the invention relates to improving the alkylation selectivity of alkylation catalysts by utilizing a catalyst moderator.

2. Description of the Prior Art

Acid catalyzed hydrocarbon conversion processes comprising contacting an alkane with an alkene are well known. The reactants are generally contacted in the liquid phase and within a broad temperature range of about $-100°$ to $100°F$. with an acid catalyst such as, for example, sulfuric acid, fluorosulfuric acid or a halogen acid, such as hydrofluoric acid.

Alkylation processes employing fluorosulfuric acid as a catalyst are described in U.S. Pat. Nos. 2,313,103, 2,344,469 and U.K. Pat. No. 537,589. The use of other acids such as trifluoromethanesulfonic acid as alkylation catalysts has also been described (T. Gramstad and R. N. Haszeldine, J. Chem. Soc., 1957, 4069–79).

Alkylation reactions of the above-mentioned types have encountered difficulties directly resulting from the high activity of the strong acid catalysts used in the reactions. For example, the intermediate alkyl carbonium ion products generated in the strong acid medium undergo a number of side reactions which lead to the formation of heavy products which then undergo cracking reactions to form undesirable light hydrocarbons. This results in a decrease in the production of desired $C_6$ to $C_9$ products and in a lowering of the octane number of the products obtained. Additionally, strong acid catalyzed alkylation reactions have suffered from a general lack of selectivity with regard to the formation of $C_8$ hydrocarbons. The octane number of alkylate is enhanced by the presence of high concentrations of $C_8$ hydrocarbons. Trimethylpentane is a particularly valuable alkylate component.

In the use of strong acids such as fluorosulfuric acid, attempts have been made to minimize competitive side reactions and to maximize $C_8$ hydrocarbon selectivity by using low reaction temperatures, i.e. $-112°$ to $-45°F$.; however, difficulties encountered in maintaining these low temperatures has made this process economically impractical. Additionally, in a further attempt to maximize $C_8$ hydrocarbon selectivity, the strong acids have been admixed with small amounts of additives such as $BF_3$ (U.S. Pat. No. 2,366,731), hydrogen halides (U.S. Pat. No. 2,259,723) and surfactants (U.S. Pat. No. 3,231,633) such as methyl isobutyl oxonium chloride, dimethyl isopropyl sulfonium chloride or sulfuric acid. The function of the surfactant, in the latter instance, is to reduce an appreciable reaction induction period (up to 210 hours) during which a predominant amount of $C_{12}+$ alkylate is formed at the expense of desired $C_8$ alkylate. In the case of sulfuric acid addition to the fluorosulfuric acid catalyst, it was observed that the induction period diminished to 125 hours; however, this is still an economically undesirable time lag. In the latter instance the alkylation was conducted at a temperature of 50°F. and a pressure of 100 psig. Other additives such as mercaptans (U.S. Pat. No. 2,880,255 — mercaptans must contain at least 8 carbon atoms per molecule) and amines (U.S. Pat. Nos. 2,880,255 and 3,324,196) have also been used admixed with fluorosulfuric acid. The above-mentioned additives have generally not provided the desired high $C_8$ hydrocarbon selectivity or have proven too expensive for commercial utilization.

SUMMARY OF THE INVENTION

In accordance with this invention, it has been found that hydrocarbon conversion reactions such as alkylation can be conducted in the presence of a catalyst mixture formed from a strong acid such as halosulfuric acid ($XSO_3H$ where X is halogen), trihalomethanesulfonic acid ($CX_3SO_3H$) or mixtures thereof and one or more moderators, generally containing at least one oxygen atom per molecule and including water, aliphatic and cycloaliphatic alcohols and ethers, aliphatic, cycloaliphatic and aromatic sulfonic and carboxylic acids and their derivatives and inorganic acids. The term "moderator" as used herein, is defined as a compound which, in combination with a strong acid, produces a catalyst system of reduced activity vis-a-vis the strong acid, and thereby decreases the probability of competing side reactions, such as polymerization, which have a detrimental effect on product quality, while increasing catalyst selectivity, resulting in high quality alkylate product.

The alcohols preferably contain 1 to 10 carbon atoms and 1 to 10 hydroxyl groups per molecule. The lower molecular weight saturated alcohols are most preferred and contain desirably 1 to 7 carbon atoms, more preferably 1 to 5 carbon atoms per molecule and 1 to 4 hydroxyl groups per molecule. The ethers are preferably saturated and contain 2 to 10, preferably 2 to 5 carbon atoms per molecule. In the latter instance while monoether compounds are preferred moderators, compounds containing up to 3 or more alkoxy groups are also contemplated. The sulfonic and carboxylic acids preferably contain 1 to 10, most preferably 1 to 7 carbon atoms per molecule. In addition, the acids can be substituted with one or more carboxy or sulfo groups. The acid derivatives include the esters and anhydrides and preferably contain 2 to 20 carbon atoms, most preferably 2 to 10 carbon atoms per molecule.

The aliphatic, cycloaliphatic and aromatic portions of the aforementioned moderators can be optionally substituted with a variety of substituents such as halogen atoms, and such groups as hydroxy, $C_1$ to $C_5$ alkoxy, $C_1$ to $C_5$ perhaloalkyl, $C_2$ to $C_6$ carboalkoxy, carboxy, $C_1$ to $C_{10}$ hydrocarbyl, preferably $C_1$ to $C_5$ alkyl or $C_3$ to $C_{10}$ cycloalkyl, or combinations thereof.

The inorganic acids will, in general, be less acidic than the strong acid component of the catalyst system and desirably will have $H_o$ values, i.e. $-\log h_o$ (Hammett acidity function), greater than about $-11$ (see Gould, E. Mechanism and Structure in Organic Chemistry, New York, Holt, Rinehart and Winston, 1959, 106). Preferred inorganic acids contain 1 to 4 hydroxyl groups per molecule.

The catalyst moderators may be used effectively with a wide variety of strong acids. Examples of strong acid components of the strong acid moderator catalyst system include halosulfuric acid such as fluorosulfuric acid, chlorosulfuric acid and bromosulfuric acid; trihalomethanesulfonic acid such as trifluoromethanesulfonic acid, trichloromethanesulfonic acid and tribromomethanesulfonic acid; or mixtures thereof and the like. Preferred strong acids include fluorosulfuric acid, trifluoromethanesulfonic acid or mixtures thereof. In addition, the phosphorus analog of trihalomethanesulfonic acid, i.e. trihalomethanephosphonic acid, may be an effective strong acid.

Illustrative, non-limiting examples of useful moderator compositions include:

water
methanol
ethanol
n-propanol
isobutanol
3-chloro-2-methyl-1-butanol
6-mercapto-4-methoxy-2-hexanol
2,2-dimethyl-4-methylthio-3-perfluoromethyl-1-hexanol
4,4-dimethyl-3-phenolthio-1-heptanol
5-carbethoxy-4,4-dimethyl-1-pentanol
2-decanol
cyclopropanol
cyclopentanol
2-chlorocyclohexanol
2-methyl-3-methylthio cyclohexanol
cyclodecanol
1,2-dihydroxyethane
1,2,3-trihydroxypropane
2,4,5-trihydroxypentane
1,3,5-trihydroxycyclohexane
1,2-dihydroxycyclooctane
pentaerythritol
methylsulfonic acid
2-chloroethylsulfonic acid
propylsulfonic acid
ethyl propanesulfonate
methyl-2-phenoxyethanesulfonate
benzenesulfonic acid
formic acid
acetic acid
propionic acid
butyric acid
heptanoic acid
decanoic acid
benzoic acid
ethyl acetate
methyl butanoate
propyl decanoate
ethyl benzoate
2-chlorobutanoic acid
2-hydroxy-5-methylhexanoic acid
phenyl acetate
trifluoroacetic acid
3,3,3-trifluoropropionic acid
ethanoic anhydride
propionic anhydride
butanoic anhydride
oxalic acid
malonic acid
pthalic acid
diethylmalonate
1,2,3-tricarboxypropane
dimethyl ether
diethyl ether
diphenyl ether
dioctyl ether
ethyl methyl ether
chloromethyl ethyl ether
decyl nonyl ether
1-methoxycyclopentyl ethyl ether
ethylene oxide
tetrahydrothiofuran
phosphoric acid
phosphorus acid
sulfuric acid
sulfurous acid
monofluorophosphoric acid
difluorophosphoric acid
orthophosphoric acid
pyrophosphoric acid
polyphosphoric acid Preferred catalyst moderators contain either a hydroxy group, such as alcohols or a hydroxy group precursor, such as ethers which cleave, it is speculated, to form alcohols under the acidic conditions of the subject invention. Of these, the most preferred compounds are the alcohols and water. It is noted that the catalyst moderator and strong acid can be premixed prior to introduction into the reactor, thereby forming the catalyst system. The catalyst may also be formed in situ.

The exact mechanism by which the moderator compounds effectuate increased catalyst selectivity while reducing competitive side reactions such as polymerization, is not known. However, the active catalyst species of the subject invention is postulated to be an equilibrium mixture comprising several components. For example, it is speculated that the addition of water to fluorosulfuric acid, results in initial ionization of the strong acid followed by hydrolysis:

The equilibrium is believed to lie towards the right and, therefore, little, if any, free water should exist in the strong acid system. Similar mechanisms can be postulated for other moderators such as alcohols and ethers.

By the very nature of the postulated mechanism, it is clear that the manner in which the active catalytic system is formed is immaterial. Thus, in the above example, mixing HF and $H_2SO_4$ in appropriate amounts should result in the same catalyst system as would be obtained by mixing water with $FSO_3H$.

In view of the above, when the catalyst system is described as "being formed from" a strong acid and a moderator, it is not meant to be limited to any one catalyst formation mode; rather, this description is used merely for convenience in providing a simple definition of the active catalyst system.

Aromatic compounds are generally not preferred as catalyst moderators since competitive sulfonation of the aromatic ring occurs under the alkylation reaction conditions. However, if the aromatic nuclei are sufficiently deactivated, with regard to electrophilic substitution, they may then be effective moderators. Thus, for example, electron withdrawing groups such as —COOH, —SO$_3$H, —COOR and the like are believed to sufficiently deactivate aromatic rings to permit their use in the subject process. In general, aromatic ring substituents with Hammett $\sigma_{meta}$ and $\sigma_{para}$ values equal to or greater than +0.01 are acceptable. For a more detailed discussion of the Hammett equation and electrophilic aromatic substitution in general, see *Mechanism and Structure in Organic Chemistry*, by Edwin S. Gould, 1959, Holt, Rinehart and Winston, Inc., pp. 220–227 and 412–463. Additionally, it is noted that highly basic materials such as amines, for example triethylamine, cannot generally be used in the concentration range of the subject process due to reaction with the strong acid.

While inorganic acids such as HCl, HBr and HI may be used as moderators, their effectiveness is diminished by their tendency to form stable halides with the olefin reactants. Halide formation, however, is not an important problem with HF. Additionally, oxidative acids such as HNO$_3$ and HClO$_4$ cannot be used as moderators due to oxidative side reactions with the olefins.

It has been found that the amount of moderator used in forming the catalyst system is an important variable in the production of high quality alkylate. It has been determined that the desired amounts of moderator will vary dependent, in part, on the alkylation temperature. Thus, for example, at temperatures between about, say, 0° and 40°F, useful amounts of moderator can range between about 5 and 45 mole % based on acid, preferably between 10 and 30 mole % and still more preferably between 15 and 25 mole %, e.g. 20 mole %. In some instances, however, it may be desirable to use somewhat lower or higher amounts of moderator, e.g. 50 mole % based on acid, where, for example, increased catalyst activity or selectivity is desired.

Figure 1:
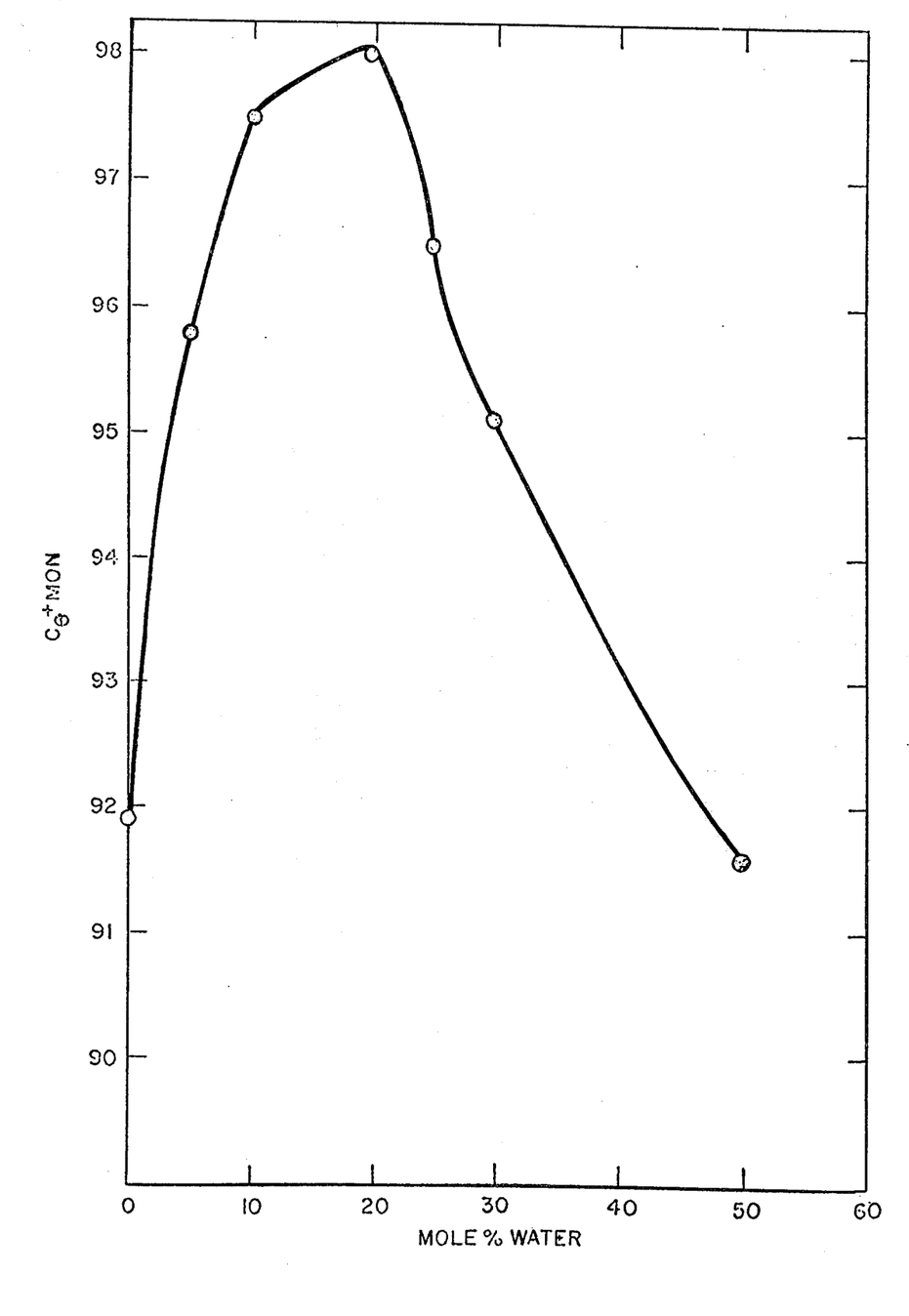
The FIGURE shows the relationship between the amount of catalyst moderator (water) added to fluorosulfuric acid and $C_6+$ alkylate MON.

In this connection, reference is made to the figure which shows the effect of water addition to fluorosulfuric acid on C$_6$+ alkylate MON (Motor Octane Number) at 0°F. Specifically, the graph refers to the alkylation of isobutane with butene-1 in the presence of a catalyst system formed by adding varying amounts of water to fluorosulfuric acid. It is noted that optimum results are obtained between about 15 and 20 mole % of water based on acid.

At higher alkylation temperatures, say, between about 40° and 100°F, increased amounts of moderator may be desirable due to the increased strong acid activity. Thus, it is within the purview of this invention to use an amount of moderator ranging between about 50 and 100 mol % based on acid at these higher temperatures. In fact, under appropriate conditions, these higher amounts of moderator may also be utilized at the lower temperatures disclosed hereinabove, if desired.

In the case of hydroxyl-containing moderators, (or moderators containing hydroxyl precursors, i.e. latent hydroxyl groups,) amounts of added moderator to the strong acid may fall below the above-specified ranges. It appears that the efficiency of hydroxy compounds is directly related to the overall number of hydroxyl groups or latent hydroxyl groups present per molecule. Thus, ethanol with one hydroxyl group should have moderator activity similar to 0.5 mole of ethylene glycol with two hydroxyl groups. Hence, as the number of hydroxyl groups or latent hydroxyl groups per molecule of moderator increases, the required amount of moderator compound will decrease.

Although the broad concentration ranges are generally independent of the type of moderator used, the preferred or optimal range will vary depending on the structure of the moderator, the reaction temperature, the concentration and nature of the olefin in the feed and the olefin space velocity.

As indicated above, trifluoromethanesulfonic acid has been found to be a particularly effective alkylation catalyst when used with a moderator. As disclosed in Chemical and Engineering News, Jan. 18, 1971 and J. Org. Chem. 39 (1), Jan. 15, 1971, the acid is a stable, colorless liquid with a strong, pungent odor and fumes copiously in moist air. Moreover, simple alkyl esters of the acid can be used as alkylation agents. The acid is non-oxidizing and has been shown to be one of the strongest proton acids known. However, while alkylation rates are high, competing polymerization reactions are also high, thus diminishing, somewhat, the efficiency of this acid as an alkylating agent. Moreover, C$_8$ alkylate selectivity is low. These difficulties can be overcome by utilizing a moderator with the acid, resulting in a substantial decrease in polymerization side reactions with a corresponding increase in C$_8$ hydrocarbon selectivity in the alkylate vis-a-vis the pure acid.

In addition to their use in classical alkylation processes as hereinabove described, the catalyst systems of the subject invention may also be used in self-alkylation processes. The C$_6$—C$_{16}$ branched chain olefins and C$_4$—C$_8$ isoparaffins are preferred reactants. The process is generally conducted in the liquid phase whereby the isoparaffin is dimerized and the olefin is saturated producing an alkylate-type product of high quality. Self-alkylation processes are generally described in U.S. Pat. No. 3,150,204. Undesired side reactions are minimized using these catalyst systems, thereby providing high yields of the desired products.

In general the amount of olefin contacted with the catalyst can range from about 0.05 to 1000 volumes of olefin per hour per volume of catalyst inventory in the reactor (v/v/hr.), i.e. olefin space velocity. Preferably, the olefin space velocity ranges from about 0.05 to 10.0 v/v/hr., and still more preferably from about 0.05 to 1.0 v/v/hr., e.g. 0.1 v/v/hr. The volume % of total catalyst in the reaction mixture or emulsion (when liquid phase operations are used) in the reactor can range from about 30 to 80 volume % based on total reaction mixture and preferably from about 50 to 70 volume %. The isoparaffin concentration, including alkylate, in the hydrocarbon phase (in a liquid phase process) can range from 40 to 100 volume % based on the total volume of the hydrocarbon phase and preferably from 50 to 90 volume %. Such isoparaffin concentrations can be maintained by recycling unreacted isoparaffin to the reactor.

Suitable olefinic reactants include C$_2$—C$_{12}$ terminal and internal monoolefins such as ethylene, propylene, isobutylene, butene-1, butene-2, trimethylethylene, the isomeric pentenes and similar higher monoolefinic hydrocarbons of either a straight chain or a branched chain structure. Preferably, the C$_2$—C$_6$ monoolefins are used, although the highly-branched C$_7$—C$_{12}$ monoolefins may also be used. Cycloolefins may also be used. The reaction mixtures may also contain small amounts of diolefins. Although it is desirable from an economic standpoint to use the normally gaseous olefins as reactants, normally liquid olefins may be used. Thus the invention contemplates the use of reactable polymers, copolymers, interpolymers, crosspolymers, and the like, of the above-mentioned olefins, such as, for example, the diisobutylene and triisobutylene polymers, the codimer of normal butylene and isobutylene, of butadiene and isobutylene, and the like. Mixtures of two or more of the olefins above described can be used as the process feedstock.

The instant catalyst systems are particularly suited for use in refinery alkylation processes. The process of the invention contemplates the use of various refinery cuts as feedstocks. Thus, $C_2$, $C_3$, $C_4$ and/or $C_5$ olefin cuts from thermal and/or catalytic cracking units; field butanes which have been subjected to prior isomerization and partial dehydrogenation treatment; refinery stabilizer bottoms; spent gases; normally liquid products from sulfuric acid or phosphoric acid catalyzed polymerization and copolymerization processes; and products, normally liquid in character, from thermal and/or catalytic cracking units, are all excellent feedstocks for the present process. Such feeds are preferably dried to control excess water buildup, i.e. about 5 to 15 ppm (weight) of water before entering the reactor.

The hydrocarbon feedstocks that are reacted with the olefins desirably comprise straight and/or branched chain $C_2$—$C_{10}$ paraffins such as hexane, butane and the like, and preferably, $C_4$—$C_6$ isoparaffins such as isobutane, isopentane, isohexane and the like. While open chain hydrocarbons are preferred, cycloparaffins may also be used, such as cyclopropane.

Preferably, the olefin is first diluted with the paraffin before being introduced into the reactor. The olefin concentration in the paraffin feed ranges from 0.5 to 25 volume % based on total feed and preferably below 10 volume %. Translated into volume ratios, high volume ratios of paraffin to olefin ranging from 10:1 to 200:1 or higher are preferred, although somewhat lower ratios may be used, i.e. 3:1. Correspondingly high volume ratios of paraffin to olefin are also desired within the reaction zone. Preferably, the paraffin/olefin ratio therein ranges from about 20:1 to 2000:1 or higher.

The process may be carried out either as a batch or continuous type of operation, although it is preferred for economic reasons to carry out the process continuously. It has been generally established that in alkylation processes, the more intimate the contact between the feedstock and the catalyst the better the yield of saturated product obtained. With this in mind, the present process, when operated as a batch operation, is characterized by the use of vigorous mechanical stirring or shaking of the reactants and catalyst.

In continuous operations, in one embodiment, reactants may be maintained at sufficient pressures and temperatures to maintain them substantially in the liquid phase and then continuously forced through dispersion devices into the reaction zone. The dispersion devices may be jets, porous thimbles and the like. The reactants are subsequently mixed with the catalyst by conventional mixing means such as mechanical agitators and the like. After a sufficient time, the product can then be continuously separated from the catalyst and withdrawn from the reaction system while the partially spent catalyst is recycled to the reactor. If desired, a portion of the catalyst can be continuously regenerated or reactivated by any suitable treatment and returned to the alkylation reactor.

As in other alkylation processes, more accurate control of the quality of the final product may be obtained if the reaction system is provided with a recycling feature wherein the partially converted hydrocarbons are mixed with fresh feed and returned to the feed dispersion device in the reactor. However, due to the high conversion efficiency of the present catalyst systems, it is preferred to effect alkylation in a once-through operation with short reaction times.

In general, reaction and/or recovery schemes and apparatus employed in conjunction with prior art liquid acid catalyst systems can be used with the catalyst systems of the present invention. Examples of potentially applicable process techniques and apparatus are described in U.S. Pat. Nos. 2,433,944, 2,479,366, 2,701,184, 2,717,913, 2,775,636, U.K. Pat. Nos. 543,046, 577,869, 731,806, 738,348, 803,458, 804,966 and 881,892, the disclosures of which are herein incorporated by reference.

In carrying out alkylations using the catalyst systems of this invention, a wide temperature range may be utilized, i.e. about $-80°$ to $100°F$.; however, fairly low reaction temperatures are preferred. Therefore, temperatures ranging from about $-80°$ to $70°F$., most preferably from about $-20°$ to $+40°F$. are usually employed. When sulfuric acid is the promoter, a preferred temperature range of about $-20°$ to $+30°F$., i.e. $0°$ to $20°F$., is used, thereby substantially eliminating the induction period noted in U.S. Pat. No. 3,231,633. Where the reaction is carried out at temperatures above about $10°F$., it is necessary that the reaction be conducted under superatmospheric pressure, if both the reactants and catalyst are to be maintained substantially in the liquid state. Typically, the alkylation reaction is conducted at pressures varying from about 1 to 20 atmospheres.

In general, it is preferable to use pressures sufficient to maintain the reactants in the liquid phase although a vapor phase operation is also contemplated. Autorefrigerative reactors and the like may be employed to maintain liquid phase operation. Although it is preferred to run the reaction neat, solvents or diluents may be employed, if desired.

In another embodiment of the invention the catalyst may be employed incorporated with a suitable solid carrier or support. Any solid carrier may be used that is substantially inert to the catalyst under the reaction conditions. Active supports may be rendered inert by coating them with an inert material such as antimony trifluoride or aluminum trifluoride. Examples of such carriers include silica gel, anhydrous $AlF_3$, aluminum phosphate, carbon, coke, firebrick and the like. When supported catalysts are used, the reactants, in vapor and/or liquid form, are contacted with the catalyst particles at conversion conditions. The catalyst materials may be maintained in a fixed bed, moving bed or fluid bed reaction zone.

The aforedescribed olefins and saturated hydrocarbons are contacted with the catalyst for a time sufficient to effect the degree of alkylation desired. In general, the time of contact is subject to wide variation, the length of residence time being dependent in part upon the reaction temperature, the olefin used and the catalyst concentration employed. By way of illustration, typical contact times can range from about five minutes to one hour or more. Much shorter contact times, i.e. as low as 0.1 seconds, can also be used, if desired.

DESCRIPTION OF THE PREFERRED EMBODIMENTS

The invention will be further understood by reference to the following examples:

EXAMPLE 1

Isoparaffin-olefin alkylation reactions were performed in a continuous manner. The apparatus employed for the purposes of these studies comprised the following types:

A. Continuous Glass Reactors

1. A cylindrically-shaped glass reactor with a volume of 300 cubic centimeters was used in the reactions wherein low hydrocarbon space velocities, i.e. 13 to 18 v/v/hr., on acid were employed. The reactor was equipped with a flat-blade mechanical stirrer to provide thorough contacting of the reactants and catalyst, a dry ice cooled condenser through which condensed hydrocarbon feed comprising isoparaffin diluted with olefin was introduced, a sidearm leading to a cooled receiver wherein alkylate product was collected, and a nitrogen inlet tube through which nitrogen was introduced in order to prevent backmixing of the catalyst and incoming feed.

2. An elongated glass reactor with a volume of 35 cubic centimeters was used in the experiments wherein high hydrocarbon space velocities, i.e. 91 v/v/hr., on acid were employed. This reactor was provided with means for recycling catalyst carried over with product. Otherwise, it was similar to the reactor described in (1).

The above-described continuous glass reactors were immersed in a cooling medium, i.e. a dry ice-alcohol mixture, in order to maintain the reactants and catalyst in the liquid phase. The reactors were first charged with the catalyst and cooled to the desired temperature. The catalyst was then diluted with isoparaffin. Olefin diluted with further amounts of isoparaffin was then added to the reactor through the condenser. Alkylate product was continually withdrawn and collected in a receiver and cooled with dry ice-alcohol mixture. The product was washed with 10% NaOH solution and then analyzed. The strong acid component of the catalyst was routinely distilled prior to use.

B. Capillary Reactor

For very short contact time operation, a capillary reactor was used. The hydrocarbon feed and catalyst were separately injected through capillary tubing under a pressure of 150 to 250 psig into a 0.05 × 0.05 inch mixing chamber which was connected to a 8–10 foot length of 18 gauge stainless steel hypodermic tubing. The feed lines, mixing chamber and reactor capillary were all immersed in a dry ice-alcohol cooling bath held at the desired temperature. The mixture of catalyst and hydrocarbons from the capillary reactor was collected in a receiver and cooled with liquid nitrogen.

The hydrocarbons were allowed to melt, decanted from the acid, washed with 10% NaOH solution and then analyzed.

Tables I and II summarize results obtained using fluorosulfuric acid admixed with water or sulfuric acid moderators vis-a-vis pur fluorosulfuric acid to catalyze alkylations conducted in continuous glass reactors and capillary reactors.

It is first noted that there was a substantial increase in the alkylate research and motor octane numbers when the strong acid was admixed with a moderator, vis-a-vis the strong acid catalyst alone. Additionally, it is noted that water and sulfuric acid are effective catalyst moderators, particularly at concentrations of about 20 mole % (based on acid). Moreover, high isoparaffin-/olefin volume ratios and low olefin space velocities, e.g. about 0.1, appear to favor high $C_8$ alkylate selectivity.

Additionally, results obtained from alkylations performed in capillary reactors, at short contact times and high olefin space velocities, were consistent with the continuous glass reactor data.

EXAMPLE 2

Table III summarizes data obtained using trifluoromethanesulfonic acid, i.e. $CF_3SO_3H$/moderator catalyst systems. The mode of operation and reaction conditions are similar to those used in Example 1.

It is noted that the use of a catalyst moderator with $CF_3SO_3H$ or $FSO_3H/CF_3SO_3H$ leads to enhanced research and and motor alkylate octane numbers.

EXAMPLE 3

Table IV summarizes alkylation experiments using olefins other than butene-1, including refinery olefin streams, as the process feedstock. Reaction conditions were similar to those described above. The refinery $C_4$ olefin stream composition is shown below:

|  | Wt. % |
|---|---|
| Propane | 0.96 |
| Propylene | 0.14 |
| Isobutane | 35.13 |
| n-butane | 12.89 |
| Butene-1 | 11.46 |
| Isobutylene | 7.55 |
| Trans-butene-2 | 16.15 |
| Cis-butene-2 | 11.67 |
| Isopentane | 3.21 |
| n-pentane | 0.02 |
| 3-methylbutene-1 | 0.52 |
| Butadiene | 0.02 |
| Pentene-1 | 0.11 |
| 2-methyl butene-1 | 0.16 |
| Total Olefin Content, Wt. % | 47.78 |

The data confirm the broad applicability of the catalyst systems to a range of olefins. Even ethylene, which cannot be alkylated efficiently with sulfuric acid, is easily converted to high quality alkylate product with the catalysts of this invention. Furthermore, refinery mixed olefin streams containing predominantly $C_4$ olefins yield high quality alkylate.

Finally, it is noted that isobutylene (see Run 4) can be converted to high octane alkylate using the catalyst system of the invention. This is an important result since isobutylene is extremely difficult to alkylate with conventional HF or $H_2SO_4$ alkylation catalysts.

EXAMPLE 4

Several batch runs were conducted with the catalyst system supported on a solid carrier. In the test runs, the catalyst and solid support were placed in a 3-neck, one-liter flask fitted with a stirrer, dry-ice reflux condenser protected by a calcium chloride-containing dryer and a gas inlet. Isobutane was fed to the flask for 7.5 minutes at a rate of 5.5 liters (gas) per minute. After five minutes, from the start of the isobutane flow, butene-1 was admitted at a flow rate of 0.055 liter per minute (gas). The flow of butene-1 was continued for nine minutes. The reaction was allowed to continue under reflux for six minutes after the flow of hydrocarbons had ceased. At the end of the reaction period, the reaction mixture was quickly cooled in a dry-ice-alcohol bath and a sample of the hydrocarbon layer was decanted, washed with 10% NaOH solution and analyzed. The experimental results are shown in Table V.

While the data are not as good as that obtained in the continuous reactor studies, nevertheless they are in the desired direction and suggest the applicability of the catalyst systems impregnated on solid carriers in alkylation reactions.

EXAMPLE 5

A series of experiments were performed with various catalyst moderators. The experimental conditions were similar to those described in Examples 1–3. The experimental results are set forth in Table VI.

The data indicate that moderators such as trifluoroacetic acid and chlorosulfuric acid are not selective in producing alkylate with high trimethylpentane content. However, difluorophosphoric acid, diethylether, ethanol and benzene-sulfonic acid appear to be quite effective in producing high quality alkylate.

Table VII shows the effect of water addition to fluorosulfuric acid on alkylate quality. Note the increased amount of trimethylpentanes in the alkylate product as the water concentration increases to about 20 mole % based on acid, followed by a rather rapid decrease in these compounds for water concentrations greater than about 20 mole %. The data is graphically represented in the figure.

TABLE I

| Run No. | 1 | 2 | 3 | 4 | 5 |
|---|---|---|---|---|---|
| Reaction Conditions[1] | | | | | |
| Olefin | | | butene-1 | | |
| Isoparaffin | | | isobutane | | |
| Isoparaffin/olefin (volume) ratio in feed to reactor | 11/1 | 11/1 | 11/1 | 176.9/1 | 176.9/1 |
| Temperature, °F. | 0 | 0 | 0 | 0 | 0 |
| Feed rate, v/v/hr. on catalyst (total hydrocarbon) | 104 | 104 | 91 | 13.7 | 13.7 |
| Olefin space velocity, v/v/hr. on catalyst | 8.63 | 8.63 | 7.55 | 0.08 | 0.08 |
| Catalyst - acid | 100% $FSO_3H$ | $FSO_3H$ | $FSO_3H$ | 100% $FSO_3H$ | $FSO_3H$ |
| - moderator | — | 14 mole %[4] $H_2O$ | 20 mole %[4] $H_2SO_4$ | — | 20 mole %[4] $H_2O$ |
| Volume Catalyst, cc | 15 | 15.7 | 15 | 100 | 100 |
| Volume $C_5^+$ alkylate yield/ volume olefin[3] | 1.77 | 1.73 | 1.76 | 1.74 | 1.72 |
| Product Distribution, Wt.%[2] | | | | | |
| $C_5$ | 5.08 | 1.98 | 4.18 | 1.37 | 0.16 |
| $C_6$–$C_7$ | 6.84 | 4.20 | 5.40 | 1.90 | 0.32 |
| Total $C_8$ | 78.19 | 86.11 | 82.48 | 93.33 | 98.33 |
| Trimethylpentanes | 64.09 | 77.10 | 70.54 | 73.95 | 94.33 |
| $C_9^+$ | 9.89 | 7.65 | 7.94 | 3.40 | 1.19 |
| $C_6$–$C_8$ alkylate research clear octane number[3] | 94.30 | 97.50 | 96.10 | 93.70 | 100.50 |
| $C_6$–$C_8$ alkylate motor clear octane number[3] | 92.80 | 95.70 | 94.50 | 92.10 | 98.10 |
| $C_6^+$ alkylate motor clear octane number[3] | 92.20 | 95.00 | 94.00 | 91.90 | 98.00 |

[1]Runs performed in continuous glass reactors.
[2]Determined by gas phase-liquid chromatography using a 300 foot capillary column with 0.01 inch i.d. and coated with DC-550 silicon oil, in conjunction with a hydrogen flame ionization detector.
[3]Calculated by computer from gas phase-liquid chromatography analysis.
[4]Based on fluorosulfuric acid.

TABLE II

| Run No. | 1 | 2 |
|---|---|---|
| Reaction Conditions[1] | | |
| Olefin | Butene-1 | Butene-1 |
| Isoparaffin | Isobutane | Isobutane |
| Isoparaffin/olefin (volume) ratio in feed to reactor | 88.4 | 88.4 |
| Temperature, °F. | 40 | 40 |
| Volume % acid in reactor | 50.5 | 40.7 |
| Olefin space velocity, v/v/hr. on catalyst | 34.81 | 53.3 |
| Catalyst - acid | 100% $FSO_3H$ | $FSO_3H$ |
| - moderator | — | 20 mole %[4] $H_2O$ |
| Volume $C_5^+$ alkylate yield/ volume olefin[3] | 1.77 | 1.74 |
| Acid loading, volume olefin/ volume acid | 0.011 | 0.016 |
| Contact time, seconds | 1.13 | 1.10 |

TABLE II-Continued

| Run No. | 1 | 2 |
|---|---|---|
| Product Distribution, Wt.%[2] | | |
| $C_5$ | 3.84 | 1.69 |
| $C_6$-$C_7$ | 4.03 | 2.68 |
| Total $C_8$ | 86.63 | 92.29 |
| Trimethylpentanes | 69.94 | 86.19 |
| $C_9^+$ | 5.50 | 3.34 |
| $C_6$-$C_8$ alkylate research clear octane number[3] | 94.20 | 99.40 |
| $C_6$-$C_8$ alkylate motor clear octane number[3] | 93.00 | 96.90 |
| $C_6^+$ alkylate motor clear octane number[3] | 92.70 | 96.60 |

[1]Runs performed in capillary reactors.
[2]Determined by gas phase-liquid chromatography using a 300 foot capillary column with 0.01 inch i.d. and coated with DC-550 silicon oil, in conjunction with a hydrogen flame ionization detector.
[3]Calculated by computer from gas phase-liquid chromatography analysis.
[4]Based on fluorosulfuric acid.

TABLE III

| Run No. | 1 | 2 | 3 | 4 |
|---|---|---|---|---|
| Reaction Conditions[1] | | | | |
| Olefin | | butene-1 | | |
| Isoparaffin | | isobutane | | |
| Isoparaffin/olefin (volume ratio in feed to reactor) | 88.4/1 | 176.9/1 | 176.9/1 | 176.9/1 |
| Temperature, °F. | 0 | 0 | 0 | 0 |
| Feed rate, v/v/hr. on catalyst (total hydrocarbon) | 91 | 91 | 91 | 91 |
| Olefin space velocity, v/v/hr. on catalyst | 1.02 | 0.51 | 0.51 | 0.51 |
| Catalyst - acid | 100% $CF_3SO_3H$ | $CF_3SO_3H$ | $FSO_3H/CF_3SO_3H$[2] | $FSO_3H/CF_3SO_3H$[2] |
| - moderator | — | 20 mole % $H_2O$[3] | — $H_2O$[3] | 20 mole % |
| Volume catalyst, cc | 15 | 15 | 15 | 15 |
| Volume $C_5^+$ alkylate yield/volume olefin[5] | 1.79 | 1.71 | 1.98 | 1.71 |
| Product Distribution, Wt.%[4] | | | | |
| $C_5$ | 4.33 | 0.42 | 17.46 | 0.07 |
| $C_6$-$C_7$ | 6.00 | 0.85 | 1.56 | 0.56 |
| Total $C_8$ | 86.47 | 96.55 | 79.38 | 97.08 |
| Trimethylpentanes | 79.78 | 91.17 | 72.95 | 93.50 |
| $C_9^+$ | 3.20 | 2.18 | 1.60 | 2.29 |
| $C_6$-$C_8$ alkylate research clear octane number[5] | 96.80 | 100.60 | 98.70 | 101.00 |
| $C_6$-$C_8$ alkylate motor clear octane number[5] | 95.20 | 97.50 | 97.00 | 97.70 |
| $C_6^+$ alkylate motor clear octane number[5] | 94.90 | 97.30 | 96.80 | 97.50 |

[1]Runs performed in continuous glass reactors.
[2]1:1 mole ratio.
[3]Based on total acid.
[4]Determined by gas phase-liquid chromatography using a 300 foot capillary column with 0.01 inch i.d. and coated with DC-550 silicon oil, in conjunction with a hydrogen flame ionization detector.
[5]Calculated by computer from gas phase-liquid chromatography analysis.

TABLE IV

| Run No. | 1 | 2 | 3 | 4 |
|---|---|---|---|---|
| Reaction Conditions[1] | | | | |
| Olefin | Propylene | Propylene | Ethylene | Isobutylene |
| Isoparaffin | Isobutane | Isobutane | Isobutane | Isobutane |
| Isoparaffin/olefin (volume) ratio in feed to reactor) | 184/1 | 184/1 | 180/1 | 176.6/1 |
| Temperature, °F. | 0 | 0 | 0 | 0 |
| Feed rate, v/v/hr. on catalyst (total hydrocarbon) | 91.0 | 13.1 | 13.7 | 18.0 |
| Olefin space velocity v/v/hr. on catalyst | 0.50[5] | 0.07[5] | 0.08[5] | 0.10[5] |
| Catalyst — acid | $FSO_3H$ | $FSO_3H$ | $FSO_3H$ | $FSO_3H$ |
| — moderator | 20 mole %[4] $H_2O$ | 20 mole %[4] $H_2O$ | 20 mole %[4] $H_2O$ | 20 mole %[4] $H_2O$ |
| Volume catalyst, cc | 15 | 100 | 100 | 100 |
| Volume $C_5^+$ alkylate yield/volume olefin[3] | 1.62 | 1.56 | 1.72[5] | 1.73 |
| Product Distribution, Wt.%[2] | | | | |
| $C_5$ | 2.13 | 0.42 | 0.00 | 1.33 |
| $C_6$-7 | 34.97 | 17.45 | 28.06 | 1.44 |
| Total $C_8$ | 58.50 | 79.41 | 66.75 | 92.93 |
| Trimethylpentanes | 56.92 | 78.57 | 66.16 | 90.40 |
| $C_9^+$ | 4.40 | 2.53 | 5.19 | 4.30 |
| $C_6$-$C_8$ alkylate research clear octane number[3] | 96.00 | 98.70 | 101.00 | 100.00 |
| $C_6$-$C_8$ alkylate motor clear octane number[3] | 94.20 | 97.10 | 97.20 | 98.50 |
| $C_6^+$ alkylate motor clear octane number[3] | 93.90 | 96.90 | 96.70 | 98.00 |
| Run No. | 5 | 6 | 7 | 8 |

TABLE IV—Continued

| Run No. | 1 | 2 | 3 | 4 |
|---|---|---|---|---|
| Reaction Conditions[1] | | | | |
| Olefin | 2-methyl-butene-2 | Refinery $C_4$ olefin | Refinery $C_4$ olefin | Refinery $C_4$ olefin |
| Isoparaffin | Isobutane | Isobutane | Isobutane | Isobutane |
| Isoparaffin/olefin (volume ratio in feed to reactor) | 170/1 | 113.4/1 | 181.5/1 | 181.5/1 |
| Temperature, °F. | 0 | 0 | 0 | 0 |
| Feed rate, v/v/hr. on catalyst (total hydrocarbon) | 91.0 | 16.3 | 91.0 | 13.1 |
| Olefin space velocity, v/v/hr. on catalyst | 0.50[5] | 0.14[5] | 0.50[5] | 0.07[5] |
| Catalyst — acid | $FSO_3H$ | 100% $FSO_3H$ | $FSO_3H$ | $FSO_3H$ |
| — moderator | 20 mole %[4] $H_2O$ | — | 20 mole %[4] $H_2O$ | 20 mole %[4] $H_2O$ |
| Volume catalyst, cc | 15 | 100 | 15 | 100 |
| Volume $C_5^+$ alkylate yield/volume olefin[3] | 2.50[5] | 1.84 | 1.85 | 1.83 |
| Product Distribution, Wt. %[2] | | | | |
| $C_5$ | 34.37 | 5.46 | 7.48 | 5.72 |
| $C_6$–$C_7$ | 1.69 | 3.91 | 2.02 | 1.04 |
| Total $C_8$ | 61.22 | 86.13 | 86.59 | 91.56 |
| Trimethylpentanes | 59.81 | 66.53 | 81.60 | 88.23 |
| $C_9^+$ | 2.72 | 4.50 | 3.91 | 1.34 |
| $C_6$–$C_8$ alkylate research clear octane number[3] | 99.70 | 92.20 | 99.80 | 100.20 |
| $C_6$–$C_8$ alkylate motor clear octane number[3] | 98.40 | 90.70 | 97.40 | 98.20 |
| $C_6^+$ alkylate motor clear octane number[3] | 98.00 | 90.60 | 97.00 | 98.00 |

[1]Runs performed in continuous glass reactors.
[2]Determined by gas phase-liquid chromatography using a 300 foot capillary column with 0.01 inch i.d. and coated with DC-550 silicon oil, in conjunction with a hydrogen flame ionization detector.
[3]Calculated by computer from gas phase-liquid chromatography analysis.
[4]Based on fluorosulfuric acid.
[5]Approximate value.

TABLE V

| Run No. | 1[1] | 2[2] | 3[1] |
|---|---|---|---|
| Reaction Conditions | | | |
| Olefin | | Butene-1 | |
| Isoparaffin | | Isobutane | |
| Carrier | Anhydrous $AlF_3$ | Anhydrous $AlF_3$ | Calcined silica gel |
| Weight of carrier in catalyst, grams[3] | 20 | 20 | 25 |
| Isoparaffin/olefin (volume ratio in feed to reactor) | 110.6/1 | 110.6/1 | 11.1/1 |
| Temperature, °F. | 11 | 11 | 11 |
| Olefin space velocity, v/v/hr. on catalyst | — | 0.13 | — |
| Reaction time, minutes | 15 | 20 | 60 |
| Catalyst — acid | 100% $FSO_3H$ | $FSO_3H$ | 100% $FSO_3H$ |
| — moderator | — | 20 mole % $H_2O$[6] | — |
| Volume $C_5^+$ alkylate yield/volume olefin[5] | — | 1.78 | — |
| Product Distribution, Wt.%[4] | | | |
| $C_5$ | 3.13 | 5.82 | 6.02 |
| $C_6$–$C_7$ | 4.99 | 5.80 | 4.51 |
| Total $C_8$ | 85.73 | 79.38 | 84.60 |
| Trimethylpentanes | 71.40 | 70.68 | 73.52 |
| $C_9^+$ | 6.15 | 9.00 | 4.87 |
| $C_6$–$C_8$ alkylate research clear octane number[5] | 95.60 | 97.40 | 96.70 |
| $C_6^+$ alkylate motor clear octane number[5] | 93.80 | 94.60 | 94.70 |

[1]Runs performed in batch-type glass reactors.
[2]Runs performed in continuous-type glass reactors.
[3]Weight of $FSO_3H$ on carrier — 15 grams.
[4]Determined by gas phase-liquid chromatography using a 300 foot capillary column with 0.01 inch i.d. and coated with DC-550 silicon oil, in conjunction with a hydrogen flame ionization detector.
[5]Calculated by computer from gas phase-liquid chromatography analysis.
[6]Based on acid.

TABLE VI

| Run No. | 1 | 2 | 3 |
|---|---|---|---|
| Reaction Conditions[1] | | | |
| Olefin | | Butene-1 | |
| Isoparaffin | | Isobutane | |
| Isoparaffin/olefin (volume ratio in feed to reactor) | | 110.6/1 | |
| Temperature, °F. | | 0 | |
| Olefin space velocity, v/v/hr. on catalyst | | 0.12 | |
| Catalyst — acid | | $FSO_3H$ | |
| — moderator | 20 mole %[5] $CF_3COOH$ | 20 mole %[5] $HF_2PO_2$ | 20 mole %[5] $ClSO_3H$ |
| Volume $C_5^+$ alkylate yield/ volume olefin[3] | 1.73 | 1.74 | 1.76 |
| Product Distribution, Wt.%[2] | | | |
| $C_5$ | 0.75 | 0.49 | 1.97 |
| $C_6$–$C_7$ | 0.84 | 0.53 | 2.52 |
| Total $C_8$ | 95.55 | 98.26 | 94.13 |
| Trimethylpentanes | 84.64 | 94.14 | 72.00 |
| $C_9^+$ | 2.86 | .72 | 1.38 |
| $C_6$–$C_8$ alkylate research clear octane number[3] | 97.60 | 100.10 | 92.30 |
| $C_6$–$C_8$ alkylate motor clear octane number[3] | 95.80 | 98.30 | 90.90 |
| $C_6^+$ alkylate motor clear octane number[3] | 95.60 | 98.20 | 90.80 |

| Run No. | 4 | 5 | 6 |
|---|---|---|---|
| Reaction Conditions[1] | | | |
| Olefin | | Butene-1 | |
| Isoparaffin | | Isobutane | |
| Isoparaffin/olefin (volume ratio in feed to reactor) | | 110.6/1 | |
| Temperature, °F. | | 0 | |
| Olefin space velocity, v/v/hr. on catalyst | 0.12 | 0.12 | 0.13 |
| Catalyst — acid | | $FSO_3H$ | |
| — moderator | 10 mole %[4] $C_6H_5SO_3H$ | 12 mole %[5] $C_2H_5OC_2H_5$ | 20 mole %[5] Ethanol |
| Volume $C_5^+$ alkylate yield/ volume olefin[3] | 1.73 | 1.72 | 1.73 |
| Product Distribution, Wt.%[2] | | | |
| $C_5$ | 0.11 | 0.00 | 0.43 |
| $C_6$–$C_7$ | 0.12 | 0.14 | 0.38 |
| Total $C_8$ | 98.89 | 99.33 | 98.44 |
| Trimethylpentanes | 95.27 | 95.92 | 95.44 |
| $C_9^+$ | 0.88 | 0.53 | 0.75 |
| $C_6$–$C_8$ alkylate research clear octane number[3] | 100.50 | 100.70 | 100.80 |
| $C_6$–$C_8$ alkylate motor clear octane number[3] | 98.50 | 98.40 | 98.40 |
| $C_6^+$ alkylate motor clear octane number[3] | 98.40 | 98.30 | 98.30 |

[1] Runs performed in continuous glass reactors.
[2] Determined by gas phase-liquid chromatography using a 300 foot capillary column with 0.01 inch i.d. and coated with DC-550 silicon oil, in conjunction with a hydrogen flame ionization detector.
[3] Calculated by computer from gas phase-liquid chromatography analysis.
[4] Used as the monohydrate — effective hydroxyl content is 20 mole % based on fluorosulfuric acid.
[5] Based on fluorosulfuric acid.

TABLE VII

| Run No. | 1 | 2 | 3 | 4 |
|---|---|---|---|---|
| Reaction Conditions[1] | | | | |
| Olefin | | Butene-1 | | |
| Isoparaffin | | Isobutane | | |
| Isoparaffin/olefin (volume ratio in feed to reactor) | 176.9/1 | 110.6/1 | 110.6/1 | 176.9/1 |
| Temperature, °F. | 0 | 0 | 0 | 0 |
| Feed rate, v/v/hr. on catalyst (total hydrocarbon) | 13.7 | 14.8 | 14.2 | 13.7 |
| Olefin space velocity, v/v/hr. catalyst | 0.08 | 0.13 | 0.13 | 0.08 |
| Catalyst — acid | $FSO_3H$ | $FSO_3H$ | $FSO_3H$ | $FSO_3H$ |
| — moderator | — | 5 mole %[4] $H_2O$ | 10 mole %[4] $H_2O$ | 20 mole %[4] $H_2O$ |

TABLE VII—Continued

| Run No. | 1 | 2 | 3 | 4 |
|---|---|---|---|---|
| Volume catalyst, cc | 100 | 96 | 100 | 100 |
| Volume $C_5^+$ alkylate yield/volume olefin[3] | 1.74 | 1.74 | 1.73 | 1.72 |
| Product Distribution, Wt.%[2] | | | | |
| $C_5$ | 1.37 | .91 | .40 | .16 |
| $C_6$–$C_7$ | 1.90 | 1.63 | .73 | .32 |
| Total $C_8$ | 93.33 | 95.40 | 97.60 | 98.33 |
| Trimethylpentanes | 73.95 | 85.50 | 91.72 | 94.33 |
| $C_9^+$ | 3.40 | 2.06 | 1.27 | 1.19 |
| $C_6$–$C_8$ alkylate research clear octane number[3] | 93.70 | 97.80 | 99.50 | 100.50 |
| $C_6$–$C_8$ alkylate motor clear octane number[3] | 92.10 | 96.00 | 97.60 | 98.10 |
| $C_6^+$ alkylate motor clear octane number[3] | 91.90 | 95.80 | 97.50 | 98.00 |

| Run No. | 5 | 6 | 7 |
|---|---|---|---|
| Reaction Conditions[1] | | | |
| Olefin | | Butene-1 | |
| Isoparaffin | | Isobutane | |
| Isoparaffin/olefin (volume ratio in feed to reactor) | 88.4/1 | 88.4/1 | 11.1/1 |
| Temperature, °F. | 0 | 0 | 0 |
| Feed rate, v/v/hr. on catalyst (total hydrocarbon) | 91.0 | 91.0 | 91.0 |
| Olefin space velocity v/v/hr. on catalyst | 1.02 | 1.02 | 7.55 |
| Catalyst — acid | $FSO_3H$ | $FSO_3H$ | $FSO_3H$ |
| — moderator | 25 mole %[4] $H_2O$ | 30 mole %[4] $H_2O$ | 50 mole %[4] $H_2O$ |
| Volume catalyst, cc | 15 | 15 | 15 |
| Volume $C_5^+$ alkylate yield/volume olefin[3] | 1.72 | 1.67 | 1.50 |
| Product Distribution, Wt.%[2] | | | |
| $C_5$ | .49 | 1.00 | 1.98 |
| $C_6$–$C_7$ | 1.90 | 2.33 | 3.05 |
| Total $C_8$ | 94.54 | 84.66 | 50.82 |
| Trimethylpentanes | 88.02 | 79.34 | 46.63 |
| $C_9^+$ | 3.07 | 12.03 | 43.85 |
| $C_6$–$C_8$ alkylate research clear octane number[3] | 99.20 | 98.40 | 98.10 |
| $C_6$–$C_8$ alkylate motor clear octane number[3] | 96.80 | 96.20 | 95.20 |
| $C_6^+$ alkylate motor clear octane number[3] | 96.50 | 95.10 | 91.60 |

[1]Runs performed in continuous glass reactors.
[2]Determined by gas phase-liquid chromatography using a 300 foot capillary column with 0.01 inch i.d. and coated with DC-550 silicon oil, in conjunction with a hydrogen flame ionization detector.
[3]Calculated by computer from gas phase-liquid chromatography analysis.
[4]Based on acid.

What is claimed is:

1. An alkylation process comprising introducing a paraffin feed and an olefin feed into an alkylation zone and contacting said feeds therein, at alkylation conditions, with a catalyst formed from a strong acid selected from the group consisting of halosulfuric acid, trihalomethanesulfonic acid and mixtures thereof, and the addition of about 5 to 100 mole %, based on acid, of (1) water, (2) a $C_1$–$C_7$ saturated aliphatic monohydroxy alcohol or (3) a mixture of water and said alcohol.

2. The process of claim 1, wherein said catalyst is formed from said strong acid and about 5 to 45 mole % water, based on said strong acid.

3. The process of claim 1, wherein said catalyst is formed from said strong acid and about 10 to 30 mole % water based on acid.

4. The process of claim 1, wherein said catalyst is formed from said strong acid and ethanol.

5. The process of claim 1, wherein said contacting is conducted at a temperature of about −80° to 100°F., at a pressure of about 1 to 20 atmospheres, and at an olefin space velocity of about 0.05 to 1000 volumes of olefin per hour per volume of catalyst.

6. The process of claim 1, wherein said olefin feed is diluted with saturated hydrocarbon prior to introducing said olefin feed into said alkylation zone, so as to provide a saturated hydrocarbon/olefin volume ratio in said olefin feed of between about 3:1 and 200:1.

7. The process of claim 1, wherein the catalyst is formed within the alkylation zone.

8. The process of claim 1, wherein said catalyst is supported on a solid carrier.

9. The process of claim 1 wherein said contacting is conducted substantially in the liquid phase.

10. An alkylation process comprising contacting a saturated paraffin and an olefin, in an alkylation zone, at alkylation conditions, with a catalyst formed from a strong acid selected from the group consisting of halosulfuric acid, trihalomethanesulfonic acid and mixtures thereof, and the addition of about 5 to 100 mole % water, based on acid, said contacting conducted substantially in the liquid phase.

11. The process of claim 10, wherein the catalyst is formed within the alkylation zone.

12. The process of claim 10, wherein said catalyst is formed from fluorosulfuric acid and about 5 to 45 mole % water, based on acid.

13. The process of claim 12, wherein said catalyst is formed from fluorosulfuric acid and about 10 to 30 mole % water, based on acid.

14. An alkylation process comprising contacting a saturated paraffin and an olefin, in an alkylation zone, at alkylation conditions, with a catalyst formed from a strong acid selected from the group consisting of halosulfuric acid, trihalomethanesulfonic acid and mixtures thereof, and the addition of about 5 to 100 mole % water, based on acid, said catalyst supported on a solid carrier.

15. An alkylation process comprising contacting a saturated hydrocarbon and an olefin at alkylation conditions with a catalyst formed from a strong acid selected from the group consisting of halosulfuric acid, trihalomethanesulfonic acid and mixtures thereof, and the addition of about 5 to 100 mole %, based on said strong acid, of difluorophosphoric acid.

16. The process of claim 15, wherein the catalyst is supported on a solid carrier.

17. An alkylation process comprising contacting a $C_2$—$C_{12}$ olefin and a $C_2$—$C_{10}$ paraffin at alkylation conditions with a catalyst formed from a strong acid selected from the group consisting of halosulfuric acid, trihalomethanesulfonic acid and mixtures thereof, and the addition of about 5 to 100 mole %, based on acid, of a $C_2$—$C_5$ saturated aliphatic monoether.

18. The process of claim 17, wherein said catalyst is formed from said strong acid and about 5 to 45 mole %, based on acid, of said ether.

19. The process of claim 17, wherein said catalyst is formed from said strong acid and diethyl ether.

20. The process of claim 17 wherein said catalyst is supported on a solid carrier.

21. An alkylation process comprising contacting a $C_2$—$C_6$ monoolefin and a $C_4$—$C_6$ isoparaffin with a catalyst formed from a strong acid selected from the group consisting of halosulfuric acid, trihalomethanesulfonic acid and mixtures thereof, and the addition of about 5 to 100 mole %, based on said strong acid, of an aromatic sulfonic acid.

22. The process of claim 21, wherein said catalyst is formed from said strong acid and about 5 to 45 mole %, based on said strong acid, of said aromatic sulfonic acid.

23. The process of claim 21, wherein said catalyst is supported on a solid carrier.

24. An alkylation process comprising introducing a $C_4$—$C_6$ isoparaffin feed and a $C_2$—$C_6$ monoolefin feed into an alkylation zone and contacting said feeds, therein, with a catalyst formed from fluorosulfuric acid, and the addition of from 5 to 45 mole %, based on acid, of ethanol, said contacting conducted at a temperature ranging from −80° to +100°F., and at an olefin space velocity ranging from about 0.05 to 1000 volumes of olefin per hour per volume of catalyst and wherein said monoolefin feed is diluted with isoparaffin prior to introducing said monoolefin feed into said zone, so as to provide an isoparaffin/olefin volume ratio in said monoolefin feed of about 3:1 to 200:1, thereby forming a reaction mixture comprising a hydrocarbon phase and a catalyst phase and recovering alkylate product of high octane number from said reaction mixture.

25. The process of claim 24, wherein the isoparaffin concentration in the hydrocarbon phase of said reaction mixture ranges from about 50 to 90 volume % based on total hydrocarbon.

26. The process of claim 24, wherein the olefin concentration in said monoolefin feed diluted with isoparaffin is about 0.5 to 25 volume % based on total hydrocarbon feed to the reactor.

27. The process of claim 24, wherein the olefin concentration in said monoolefin feed diluted with isoparaffin is below about 10 volume % based on total hydrocarbon feed to the reactor.

28. The process of claim 24, wherein the isoparaffin/olefin volume ratio within the reactor ranges from about 20:1 to 2000:1.

29. The process of claim 24, wherein the volume percent of catalyst in the reaction mixture ranges between about 30 and 80 volume % based on total mixture.

30. The process of claim 24, wherein said catalyst is supported on a solid carrier.

31. An alkylation process comprising contacting a $C_2$—$C_6$ monoolefin and a $C_4$—$C_6$ isoparaffin with a catalyst formed by mixing a major amount of fluorosulfuric acid with a minor amount of sulfuric acid, where said contacting is conducted at a temperature ranging from about −20° to 30°F.

32. The process of claim 1, wherein the temperature at which the process is conducted ranges between about 40° and 100°F.

33. The process of claim 2, wherein the temperature at which the process is conducted ranges between about −20° and +40°F.

* * * * *